US012741907B1

(12) United States Patent
Ackert et al.

(10) Patent No.: US 12,741,907 B1
(45) Date of Patent: Sep. 22, 2026

(54) MARBLED CAST STONE

(71) Applicants: Paul Ackert, Poughkeepsie, NY (US); John Ackert, Poughkeepsie, NY (US)

(72) Inventors: Paul Ackert, Poughkeepsie, NY (US); John Ackert, Poughkeepsie, NY (US)

( * ) Notice: Subject to any disclaimer, the term of this patent is extended or adjusted under 35 U.S.C. 154(b) by 0 days.

(21) Appl. No.: 19/421,346

(22) Filed: Dec. 16, 2025

(51) Int. Cl.

| | |
|---|---|
| ***C04B 14/42*** | (2006.01) |
| ***C04B 28/04*** | (2006.01) |
| ***C04B 40/00*** | (2006.01) |
| ***C04B 40/02*** | (2006.01) |
| *C04B 103/30* | (2006.01) |
| *C04B 103/54* | (2006.01) |
| *C04B 111/54* | (2006.01) |

(52) U.S. Cl.
CPC .............. *C04B 14/42* (2013.01); *C04B 28/04* (2013.01); *C04B 40/0046* (2013.01); *C04B 40/0254* (2013.01); *C04B 2103/30* (2013.01); *C04B 2103/54* (2013.01); *C04B 2111/545* (2013.01)

(58) Field of Classification Search
CPC ..... C04B 14/42; C04B 28/04; C04B 40/0046; C04B 40/0254; C04B 2103/54; C04B 2103/30; C04B 2111/545
See application file for complete search history.

(56) References Cited

U.S. PATENT DOCUMENTS

| | | | | |
|---|---|---|---|---|
| 5,248,338 | A * | 9/1993 | Price | B29C 39/12 106/712 |
| 2003/0172849 | A1 | 9/2003 | Collier | |
| 2008/0008821 | A1 | 1/2008 | Sandor | |
| 2016/0017613 | A1 | 1/2016 | Nelson | |
| 2025/0065534 | A1 | 2/2025 | Godelmann | |

FOREIGN PATENT DOCUMENTS

| | | | | |
|---|---|---|---|---|
| JP | 2001140453 A * | 5/2001 | | E04F 13/14 |
| KR | 100778528 B1 * | 11/2007 | | C04B 28/04 |

OTHER PUBLICATIONS

KR 100778528 B1_Machine Translation (Year: 2007).*
JP 2001140453 A_Machine Translation (Year: 2001).*
Motor Coater TDS/Directions & Application Information, Engine Enamel, kbs-coatings.com, 2 pages, Revised May 9, 2025.

* cited by examiner

*Primary Examiner* — Amber R Orlando
*Assistant Examiner* — Anastasia A. Kuvayskaya
(74) *Attorney, Agent, or Firm* — Saile Ackerman LLC; Stephen B Ackerman; Rosemary L.S. Pike

(57) ABSTRACT

A marbled cast stone and a method for manufacturing it are described. A dry concrete mixture is provided. Water is added to the dry concrete mixture and mixed in to produce a wet concrete mixture. Glass fibers are added to the wet concrete mixture and mixed in to produce a glass fiber reinforced concrete mixture. An oil-based enamel pigment is added to the glass fiber reinforced concrete mixture and mixed slowly with low agitation until color contrasting marbling occurs to produce a marbled concrete mixture. Thereafter, the marbled concrete mixture is poured into a mold and allowed to cure and dry.

3 Claims, 1 Drawing Sheet

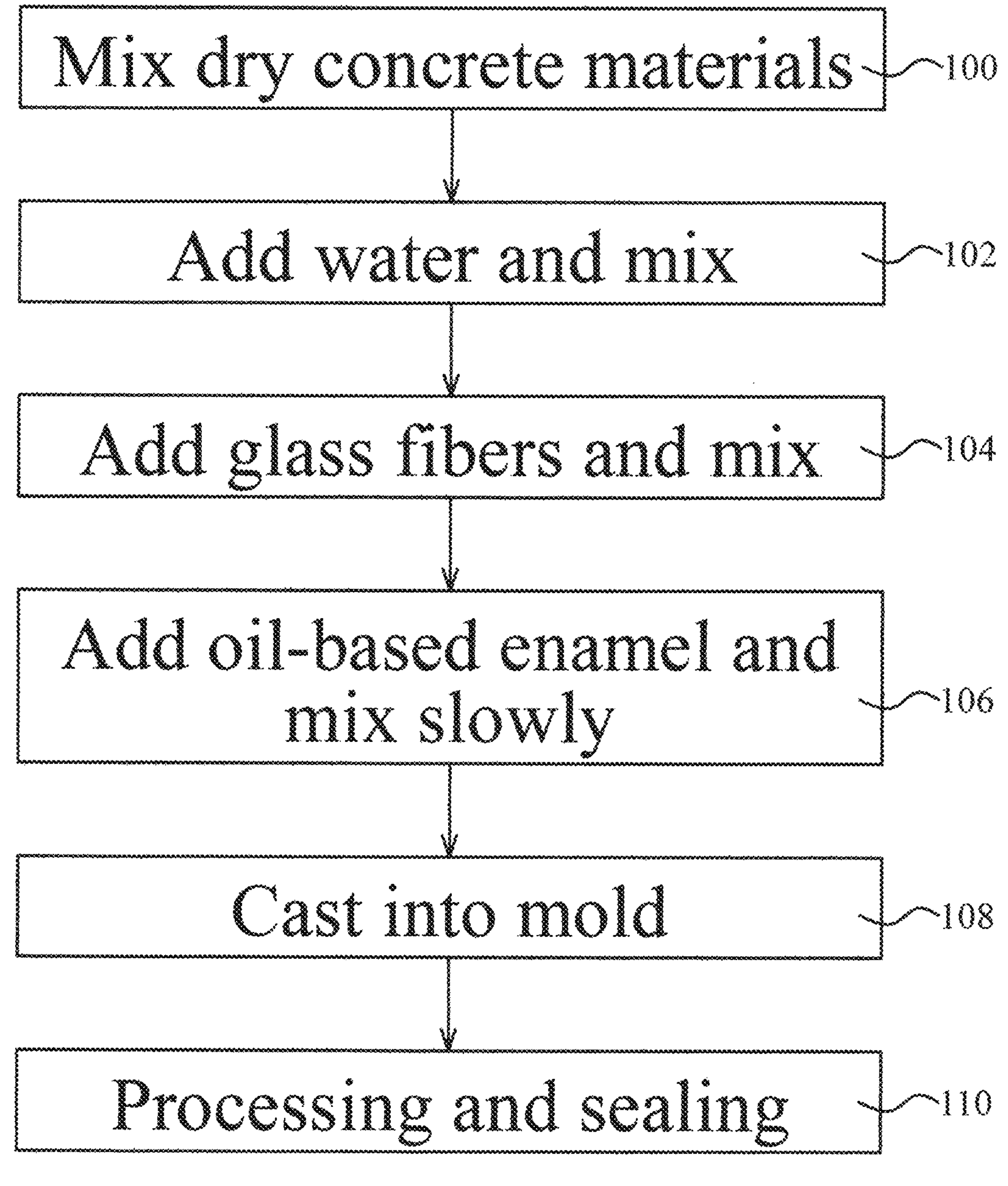
Mix dry concrete materials
100
Add water and mix
102
Add glass fibers and mix
104
Add oil-based enamel and mix slowly
106
Cast into mold
108
Processing and sealing
110

MARBLED CAST STONE

(1) TECHNICAL FIELD

The disclosure relates to cast stone, and more particularly, to manufacturing a cast stone that includes the characteristics of marble.

(2) BACKGROUND

Concrete is a construction material that can be mixed and molded into many different shapes for many construction purposes. Marble is a naturally occurring limestone that usually includes veins and swirls of color. It is highly desirable in construction because of its beauty and durability, but it is also expensive,

SUMMARY

A primary objective of the present disclosure is to provide an economical method for manufacturing a material that includes the qualities and characteristics of marble.

A further objective of the present disclosure is to provide a manufactured stone with integral marbling throughout the product.

Another objective is to provide a manufactured stone with integral marbling that is also heat and stain resistant.

In accordance with the objectives of the present disclosure, a marbled cast stone, and a method for manufacturing a marbled cast stone, are achieved. A dry concrete mixture is provided. Water is added to the dry concrete mixture and mixed in to produce a wet concrete mixture. Glass fibers are added to the wet concrete mixture and mixed in to produce a glass fiber reinforced concrete mixture. An oil-based enamel paint is added to the glass fiber reinforced concrete mixture and mixed slowly with low agitation until color contrasting marbling occurs to produce a marbleized concrete mixture. Thereafter, the marbled concrete mixture is poured into a mold and allowed to cure and dry.

BRIEF DESCRIPTION OF THE DRAWINGS

In the accompanying drawings forming a material part of this description, there is shown:

FIG. 1 is a flowchart of the method of manufacture in the present disclosure.

DETAILED DESCRIPTION

The present disclosure describes a marbled cast stone and a method to manufacture it. This cast stone is a glass fiber reinforced concrete (GFRC) manufactured with an oil-based enamel that is integrated during mixing and casting to produce a marbled cast stone product that can be used in a wide range of applications, such as interior and exterior wall cladding, tiling, pavers, table tops, countertops, floor tiles, chairs, desks, and so on.

Referring now more particularly to FIG. 1, the method of the present disclosure for manufacturing a marbled cast stone product will be described. In step 100, dry ingredients are added to a mixing vessel such as a cement mixer or a large bucket. These include, for example, White Portland Cement, a polymer, pigment, and a plasticizer. The dry ingredients are mixed thoroughly to fully incorporate all materials. This may take approximately 5-7 minutes, depending on batch size.

Next, in step 102, water is added and mixed thoroughly until the materials have a thick milkshake consistency.

In step 104, Glass Fibers are added to the mixture. Preferably Alkaline resistant Glass Fibers are used, about 19 mm long; each fiber is about a 200 filament bundle. Glass Fibers are added in a ratio of 2.5% of the total batch weight. For example, a 10 pound batch of concrete would use 0.25 pounds of glass fibers. The Glass Fibers are mixed until they are fully incorporated into the concrete mixture and no longer visible.

In step 106, an oil-based enamel paint is added in a ratio of 3:1 by weight of water to enamel. More than one color could be added, so long as the total ratio of water to enamel remains 3:1. Preferably, a deodorizing agent is added to the paint prior to usage to eliminate a strong paint odor from the finished product. The oil-based enamel paint should have a high heat rating. An example of an oil-based enamel paint that can be used is Motor Coater Engine Enamel (KBS Coatings, Valparaiso, IN).

The Oil Based enamel paint is mixed slowly with low agitation until color contrasting marbling occurs. This might be for 5-10 seconds, depending on batch size. Mixing should be stopped as soon as the enamel is mixed throughout the product with contrast very evident. It is not to be blended or emulsified into a muted combination of colors.

In step 108, the mixture must be cast into a mold immediately, tapping the mold with a rubber mallet to ensure that the mixture is fully dispersed. Larger batches may require a low or minimal vibration with a motor to fully disperse the mixture into the mold. The mixture is dense enough that the colors will not mix further during pouring into the mold.

In the processing and sealing step 110, the mold is covered with plastic and insulation blankets and allowed to cure in the mold for about 48 hours. After that, the cast stone is removed from the form and allowed to air dry for about 12 hours. The cast stone should be wiped down with or dipped into an etching solution (10 parts water to 1 part muriatic acid) with minimal abrasion, then wiped down with a wet rag and clean water and allowed to air dry for one hour. Next, apply two coats of high gloss concrete countertop sealer. Finally, lightly wet sand with 800 grit and apply one final coat of high gloss countertop sealer.

The completed cast stone exhibits a marbleized appearance throughout the product. It is both heat and stain resistant. The result is an affordable product with a very high-end look.

What is claimed is:

1. A marbled cast stone comprising:

a glass fiber reinforced concrete mixture; and an oil-based enamel paint that has been mixed into said glass fiber reinforced concrete mixture to provide marbling of pigment within the finished said marbled cast stone.

2. The marbled cast stone according to claim 1 wherein said glass fiber reinforced concrete mixture contains glass fibers that are 2.5% of the total weight of said glass fiber reinforced concrete mixture.

3. The marbled cast stone according to claim 1 wherein said oil-based enamel paint is in a ratio of 3:1 of water: enamel, by weight, relative to water used in creating said glass fiber reinforced concrete mixture.

* * * * *